US010044943B2

(12) United States Patent
Saito

(10) Patent No.: US 10,044,943 B2
(45) Date of Patent: Aug. 7, 2018

(54) DISPLAY CONTROL APPARATUS, DISPLAY CONTROLLING METHOD, AND PROGRAM, FOR ENLARGING AND DISPLAYING PART OF IMAGE AROUND FOCUS DETECTION AREA

(71) Applicant: CANON KABUSHIKI KAISHA, Tokyo (JP)

(72) Inventor: Kyota Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/186,174

(22) Filed: Jun. 17, 2016

(65) Prior Publication Data

US 2016/0373660 A1    Dec. 22, 2016

(30) Foreign Application Priority Data

Jun. 19, 2015    (JP) .................. 2015-123530

(51) Int. Cl.
| | | |
|---|---|---|
| *H04N 5/262* | (2006.01) | |
| *H04N 5/232* | (2006.01) | |
| *G03B 13/00* | (2006.01) | |
| *G06T 3/40* | (2006.01) | |

(52) U.S. Cl.
CPC ....... *H04N 5/2628* (2013.01); *H04N 5/23216* (2013.01); *H04N 5/23293* (2013.01); *H04N 5/23296* (2013.01); *G06F 2203/04806* (2013.01); *G06T 3/40* (2013.01); *H04N 5/23212* (2013.01)

(58) Field of Classification Search
CPC .......... H04N 5/23293; H04N 5/23212; H04N 5/2628; H04N 5/23296; H04N 5/23216; G06F 2203/04805; G06F 2203/04806; G06F 2203/04808; G06F 2320/068; G06F 2340/045
USPC ................. 348/240.99, 240.2, 345, 346, 349
See application file for complete search history.

(56) References Cited

U.S. PATENT DOCUMENTS

| | | | | | |
|---|---|---|---|---|---|
| 7,469,054 | B2* | 12/2008 | Aratani | ..................... | G06T 3/40 345/619 |
| 7,853,140 | B2* | 12/2010 | Sugimoto | .......... | H04N 5/23296 396/121 |
| 8,054,366 | B2* | 11/2011 | Hirai | .................. | H04N 5/23212 348/333.01 |
| 8,466,977 | B2* | 6/2013 | Yoshida | ................. | H04N 5/232 348/222.1 |

(Continued)

FOREIGN PATENT DOCUMENTS

JP    2008211630 A    9/2008

*Primary Examiner* — Ngoc-Yen Vu
(74) *Attorney, Agent, or Firm* — Canon U.S.A., Inc. IP Division

(57) ABSTRACT

An enlargement area of an image including a focus detection area is enlarged and displayed, and a focus frame is displayed on a display screen over a location corresponding to a position of the focus detection area included in the enlargement area. The focus frame moves on the display screen in accordance with an instruction received via an input unit. When the focus frame moves to a display end, enlargement display is temporarily canceled in order to display the whole image on the display screen, and the focus frame is displayed on the display screen over a location corresponding to a current position of the focus detection area in the whole image.

9 Claims, 6 Drawing Sheets

(56) References Cited

U.S. PATENT DOCUMENTS

| | | | | |
|---|---|---|---|---|
| 8,654,243 B2* | 2/2014 | Hada | ............ | G03B 13/00 |
| | | | | 348/239 |
| 8,823,837 B2* | 9/2014 | Kim | ............ | H04N 5/23293 |
| | | | | 348/240.2 |
| 2003/0076429 A1* | 4/2003 | Karasaki | ............ | H04N 5/23212 |
| | | | | 348/240.2 |
| 2009/0185064 A1* | 7/2009 | Maniwa | ............ | H04N 5/23212 |
| | | | | 348/333.11 |
| 2010/0053365 A1* | 3/2010 | Abe | ............ | H04N 1/3875 |
| | | | | 348/222.1 |
| 2016/0381281 A1* | 12/2016 | Ueguri | ............ | H04N 5/23212 |
| | | | | 348/333.02 |
| 2017/0272661 A1* | 9/2017 | Tsubusaki | ............ | H04N 5/23296 |

* cited by examiner

DISPLAY CONTROL APPARATUS, DISPLAY CONTROLLING METHOD, AND PROGRAM, FOR ENLARGING AND DISPLAYING PART OF IMAGE AROUND FOCUS DETECTION AREA

BACKGROUND OF THE INVENTION

Field of the Invention

The present invention relates to a display control apparatus, a display controlling method, and a program for enlarging and displaying a focus detection area of a captured image.

Description of the Related Art

In a digital camera, an object image and an OSD (On Screen Display) are displayed over each other on an electronic finder with an LCD panel.

In an autofocus camera, contrast and the like of an area (focus detection area) of a part of an image obtained by an image capture element are analyzed, and based on the analysis result, an optical lens is driven to a position where focus is obtained. Although a focus detection area is generally set at the center of a screen in many cases, there are some models in which any location on a screen is designated and an object displayed thereon comes into focus. The focus detection area is displayed by, for example, a green rectangular frame-like shape on the screen of the electronic finder, and a user moves its position on the screen by an arrow button or the like to change a part of an object that comes into focus.

In actual capturing, the main object is not always at the center of the screen, and a user wants to capture an image with a free composition in many cases. For example, in portrait photograph or the like, a user wants to bring focus on a face of an object person in some cases. A technique that allows the focus detection area to change within the angle of view is useful in such a capture scene.

It is difficult to confirm whether or not focus by autofocus is surely brought on an intended object part while an image of full angle of view is being displayed since a screen of an electronic finder is small and the resolution is limited. A function to enlarge a part of an image is known as a measure against such a problem. For example, an area of a part including a focus detection area is enlarged to full screen to be displayed by pressing a zoom button. Accordingly, it is possible to visually confirm whether or not focus is brought on an intended object part on a screen of an electronic finder.

In addition, a user sometimes wants to move a focus detection area while an area of a part including the focus detection area is being enlarged and displayed. As a solution for such a demand, a technique to move an enlargement area while the focus detection area is being fixed at the center of a screen has been proposed (Japanese Patent Application Laid-Open No. 2008-211630).

The technique described in Japanese Patent Application Laid-Open No. 2008-211630 has a problem that the positional relationship of the current display area with respect to the whole angle of view is unclear. That is, it is difficult for a user to understand which part of the whole angle of view is displayed on an electronic finder. When a user cannot understand this, it is necessary to cancel enlargement display and confirm the positional relationship of a focus detection area with respect to the whole angle of view on a screen of an electronic finder to have an enlarged display again. It requires a complicated operation.

SUMMARY OF THE INVENTION

An object of the present invention is to prevent a user from losing the positional relationship of an enlargement area with respect to the whole angle of view of an image when moving a focus detection area while an area of a part of the image including the focus detection area is being enlarged and displayed.

One aspect of the invention according to the present application is a display control apparatus including a processor, and a memory storing a program which, when executed by the processor, causes the display control apparatus to: enlarge and display an enlargement area of an image including a focus detection area on a screen; display a focus frame on the screen over a location corresponding to the focus detection area included in the enlargement area; move the focus frame on the screen in response to an operation by a user; and display the whole of the image on the screen instead of the enlargement area of the image if the focus frame moves to an end of the screen.

Further features of the present invention will become apparent from the following description of exemplary embodiments (with reference to the attached drawings).

DESCRIPTION OF THE EMBODIMENTS

Embodiments of the present invention will be described below in detail with reference to the drawings. Although a case where the present invention is applied to a digital camera will be described, the present invention is not limited thereto and can be applied to any apparatus as long as it is an image capture apparatus with a display screen or a display control apparatus for controlling a display apparatus.

Embodiment 1

Figure 1:
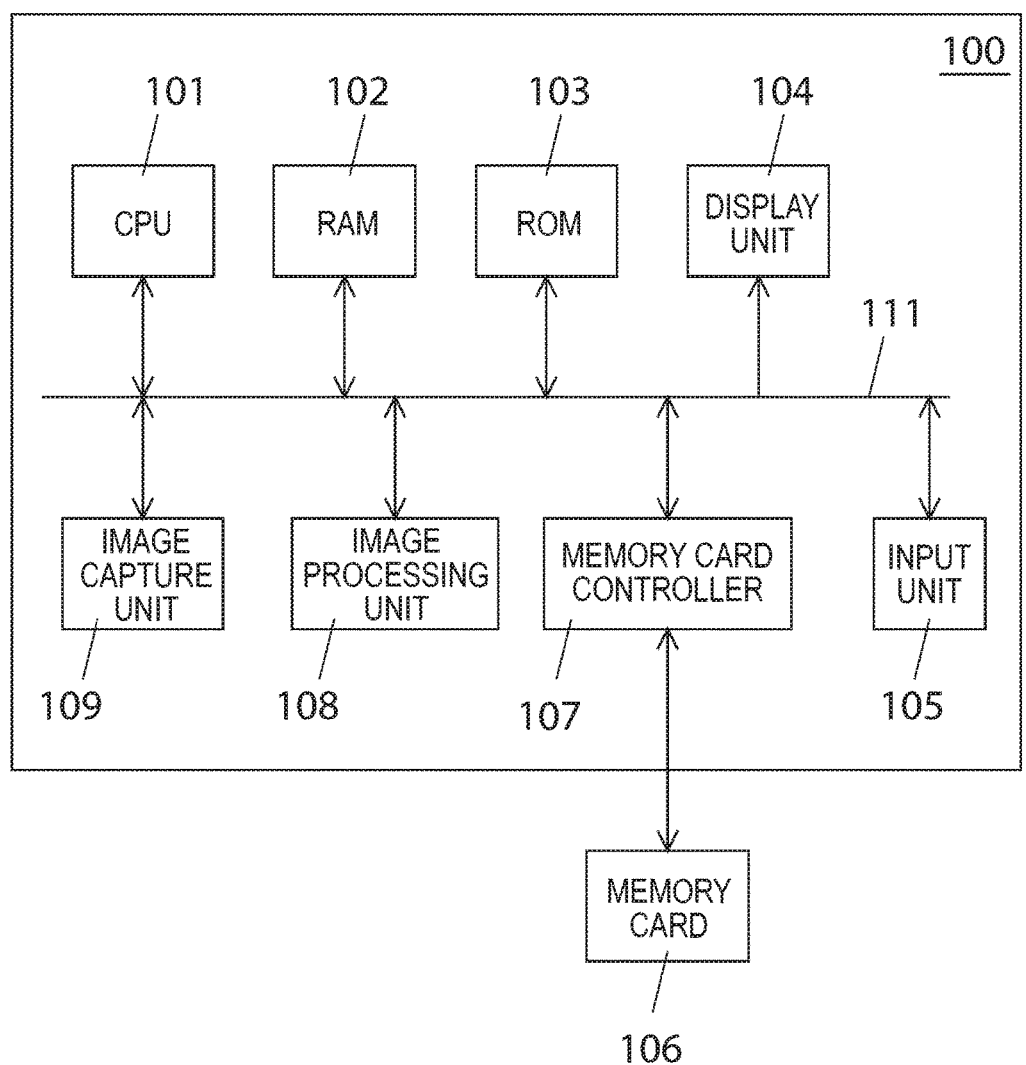
FIG. 1 is a block diagram showing a schematic structure of a display control apparatus according to one embodiment of the present invention.
Figure 2:
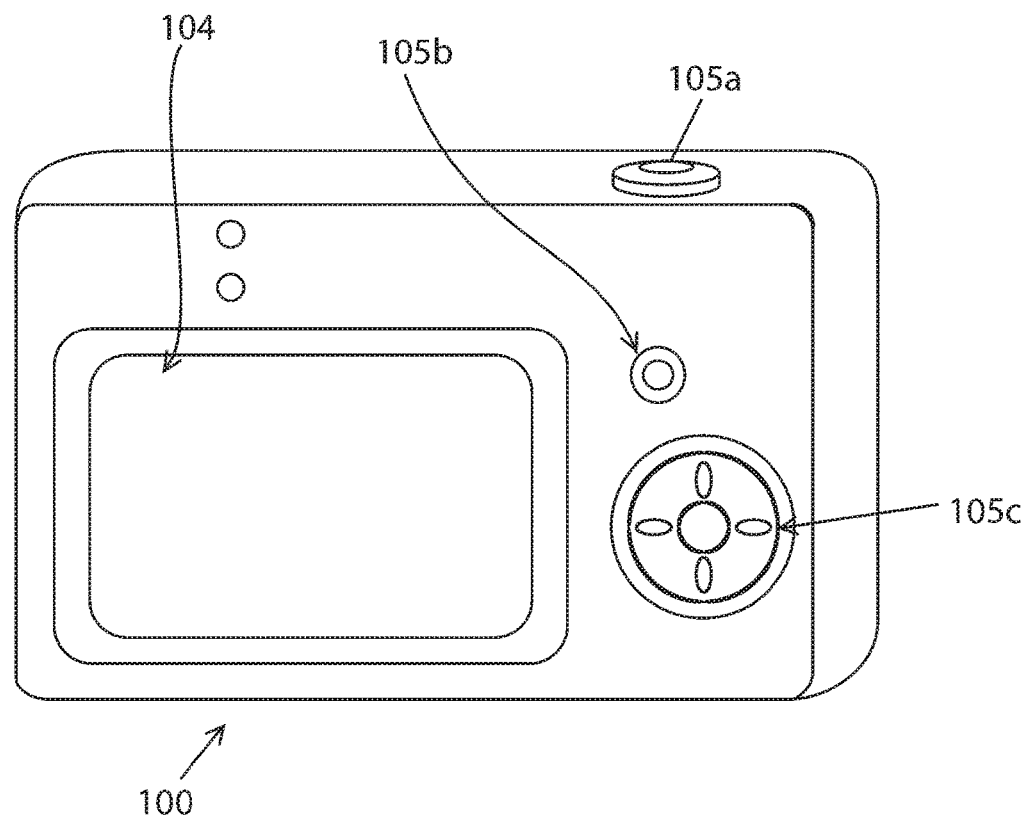
FIG. 2 is a rear view of an image capture apparatus according to one embodiment of the present invention.

FIG. 1 is a block diagram showing a schematic structure of a digital camera 100 that is one embodiment of an image capture apparatus according to the present invention. FIG. 2 is a rear perspective view illustrating the digital camera 100 of FIG. 1.

The digital camera 100 includes a CPU 101, a RAM 102, a ROM 103, a display unit 104, an input unit 105, a memory card controller 107, an image processing unit 108, and an image capture unit 109, and these are connected to an internal bus 111. A memory card 106 is connected to the memory card controller 107.

The CPU 101 is an arithmetic processing unit for controlling an operation of the digital camera 100 and a control unit for executing various programs according to instructions input by a user via the input unit 105 to perform display control of the display unit 104 and the like. Images and programs for performing various processing described later such as computer booting processing and basic input/output processing are stored in the ROM 103. The CPU 101 reads a program from the ROM 103, and controls each part and performs arithmetic processing based on the program thus read to implement various operations. The RAM 102 is used as a working area of the CPU 101.

The display unit 104 is a display device with an LCD panel that realizes a graphic user interface and displays object images and various items. The display unit 104 is used as an electronic finder.

The input unit 105 is means for receiving instructions from the user and includes a shutter release button 105a, a zoom button 105b, an arrow button 105c, a slide switch (not illustrated), an electronic dial (not illustrated), and a touch panel provided on the display unit 104. The user operates the input unit 105 to input various instructions to the CPU 101 in order to operate the digital camera.

Images captured by the digital camera 100 are stored in the memory card 106. The memory card 106 can be attached to and detached from the digital camera 100 and connected to the memory card controller 107 when attached. The memory card controller 107 can read and write data from and to the connected memory card 106.

The image capture unit 109 captures an object in accordance with an input of a capture instruction by the user via the input unit 105. Image data generated by capturing by the image capture unit 109 is sent to the image processing unit 108 via the internal bus 111, and the image processing unit 108 performs various image processing and compression coding processing on the image data to generate an image file. The generated image file is sent to the memory card 106 via the memory card controller 107 and stored in the memory card 106. The image capture unit 109 can capture both motion images and still images and the user can select motion image capture and still image capture via the input unit 105.

Figure 3:
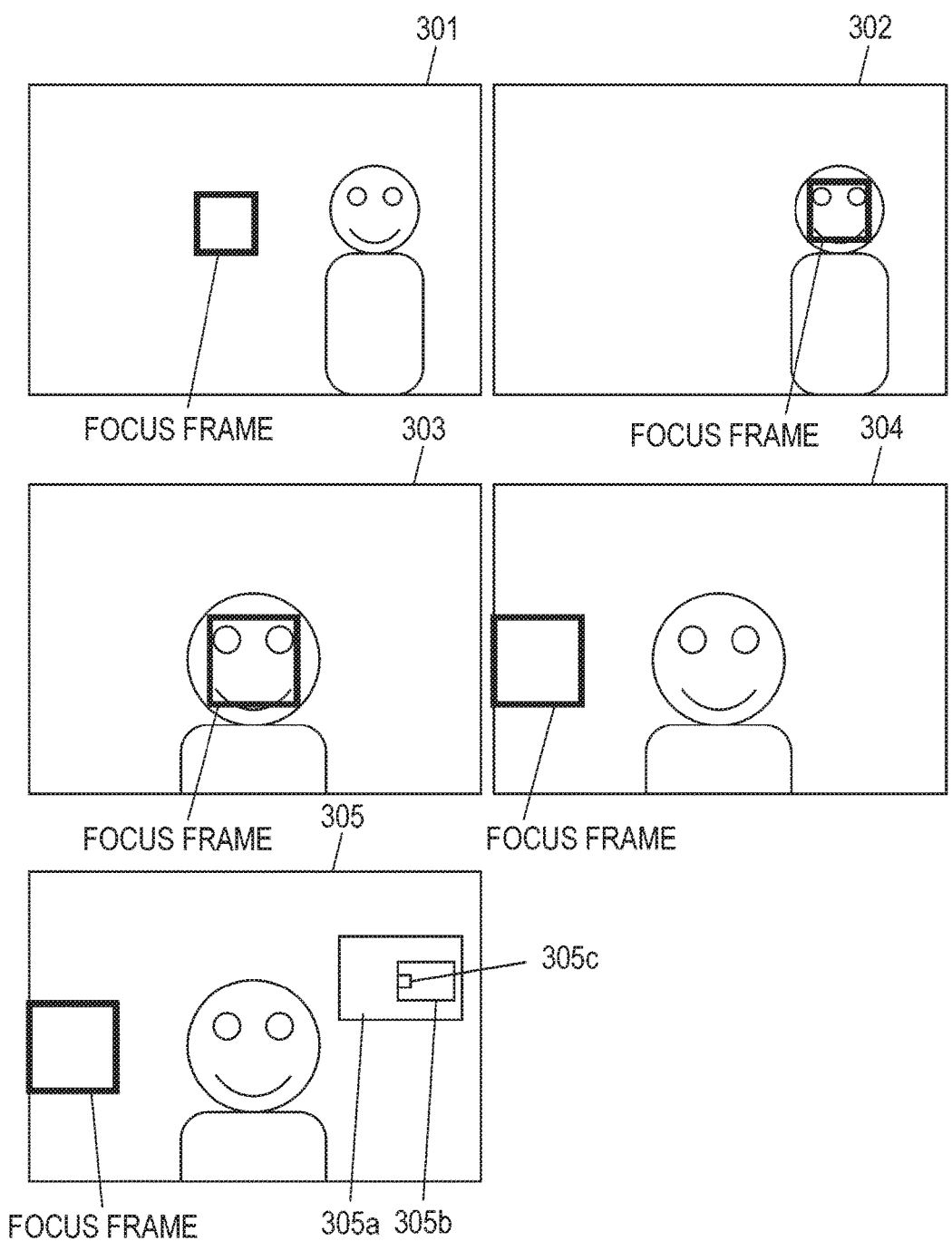
FIG. 3 shows examples of display on a screen according to one embodiment of the present invention.
Figure 4:
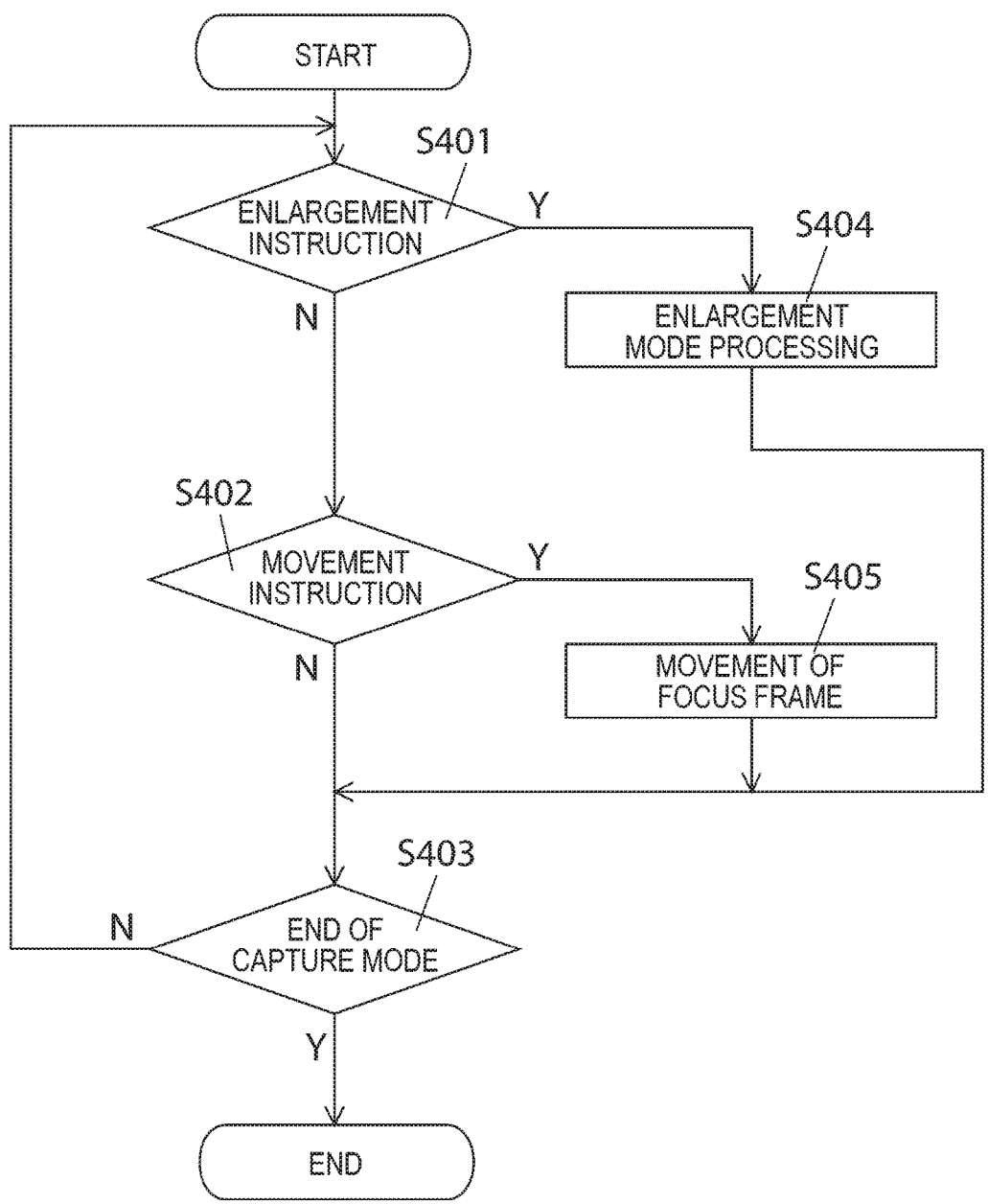
FIG. 4 is a flow chart of an operation of a capture mode of the display control apparatus according to one embodiment of the present invention.

FIG. 3 shows examples of images displayed on the display unit 104, and FIG. 4 is a flow chart of an operation in the capture mode according to the present embodiment. The operation in the capture mode of the digital camera 100 will be described with reference to FIGS. 3 and 4.

In the image capture unit 109, an image capture element generates an image signal from an object optical image by an optical lens, and the image capture unit 109 outputs the captured image data to the internal bus 111 in a predetermined video signal format. The image processing unit 108 loads the captured image data from the image capture unit 109 into a frame buffer of the RAM 102. The display unit 104 periodically obtains the captured image data stored in the frame buffer and displays the captured image data thus obtained in live view.

The image processing unit 108 also analyzes an area of a part of the captured image data (focus detection area) and supplies data for adjusting focus to the CPU 101. The CPU 101 drives an optical lens of the image capture unit 109 so that an object in the focus detection area comes into focus in accordance with the data for adjusting focus supplied from the image processing unit 108. In still image capture, the CPU 101 performs autofocus operation once by pressing the shutter release button 105a halfway, and in motion image capture, the CPU 101 continuously performs autofocus operation regardless of whether a motion image is being recorded.

The CPU 101 draws a green rectangular frame (focus frame) indicating a focus detection area in a frame buffer for OSD of the RAM 102. Accordingly, the display unit 104 displays a focus frame of OSD over the captured image as shown as a display example 301 in FIG. 3. The initial position of the focus frame is generally the center of the screen. The CPU 101 continuously and simultaneously controls the image processing unit 108 and the display unit 104 so that the positions in the captured images of the focus detection areas (focus frames) in the image processing unit 108 and the display unit 104 are the same.

In the digital camera 100, the focus frame can be moved on the screen by the arrow button 105c, and it is possible to focus the focus frame on any object part on the display screen. Accordingly, the user can bring any part on the display screen into focus as shown as a display example 302.

When the user presses the zoom button 105b in the display example 302 and the CPU 101 receives an instruction of enlarged display (Yes in S401), the CPU 101 proceeds to enlargement mode processing (S404) in which an area of a part of the captured image with the focus frame being the center is enlarged and displayed. Detail of the enlargement mode processing will be described later.

When the user operates the arrow button 105c and the CPU 101 detects an instruction to move the focus frame (Yes in S402), the focus frame is moved by an amount corresponding to the operation of the arrow button 105c in the direction of the operation of the arrow button 105c on the screen of the display unit 104 in Step S405. At the same time, the CPU 101 controls the image processing unit 108 so that the position of the focus detection area in the captured image is moved by an amount corresponding to a rate of movement of the focus frame on the display screen of the display unit 104. In accordance with continuous input of the movement instruction, the CPU 101 instructs the image processing unit 108 and the display unit 104 to move the focus detection area and the focus frame.

For example, the CPU 101 moves the focus frame by a % on the display screen of the display unit 104 for one click of the arrow button 105c. In accordance with this, the CPU 101 causes the image processing unit 108 to move the focus detection area by an amount corresponding to a rate of movement of the focus frame on the display screen of the display unit 104. When the user continues to press the arrow button 105c, the CPU 101 moves the frame on the display screen of the display unit 104 by a % per a certain period by key repeat, and causes the image processing unit 108 to move the focus detection area by an amount corresponding to movement of the frame.

Figure 5:
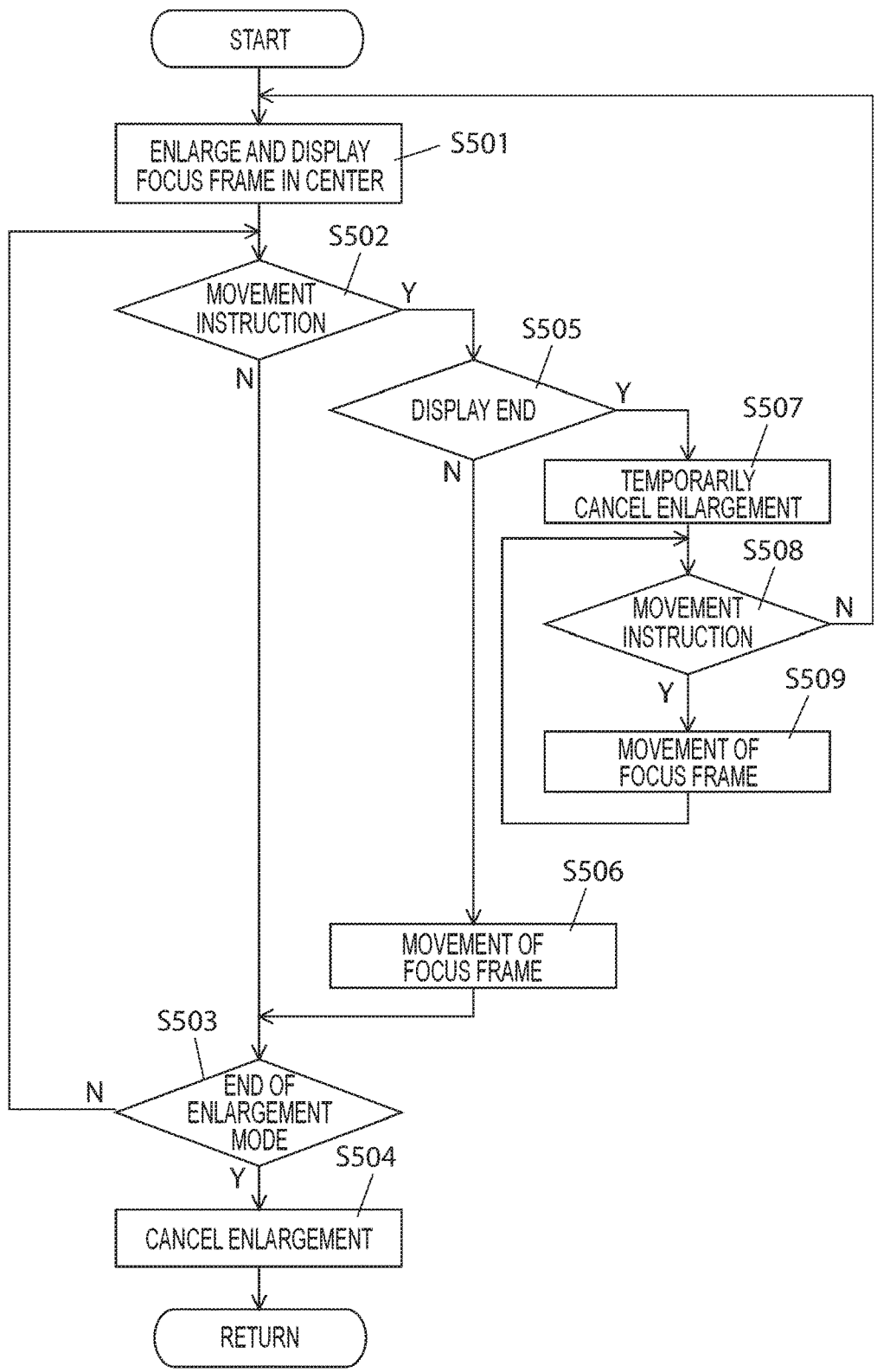
FIG. 5 is a flow chart of an operation of an enlargement mode of the display control apparatus according to one embodiment of the present invention.

When the user presses the zoom button 105b and the CPU 101 detects an enlargement instruction (Yes in S401), the CPU 101 proceeds to enlargement mode processing (S404). FIG. 5 is a detailed flow chart of the enlargement mode processing (S404). The zoom button 105b is a toggle button, and the CPU 101 proceeds to the enlargement mode in accordance with pressing of the zoom button 105b in the normal mode and returns to the normal mode by pressing of the zoom button 105b in the enlargement mode.

In the enlargement mode processing, the CPU 101 first controls the display unit 104 in Step S501, and enlarges and displays an area of a part of the captured image data with the focus frame being the center as shown as a display example 303. The enlargement rate at that time is n times. Note that n is larger than 1, and the enlargement area is within an area of 1/n of the whole captured image. With this enlarged display, the user can visually confirm in detail whether a desired object part in the focus detection area is brought into focus.

When the user operates the arrow button 105c and the CPU 101 detects an instruction to move the focus frame (Yes in S502), the CPU 101 first determines whether the focus frame reaches an end of the display screen (display end) (S505). In determination of whether the focus frame reaches the display end, a certain width of margin is set around the focus frame, and it is determined that the focus frame reaches the display end when the area including the focus frame and the width of margin reaches the display end. The margin is a predetermined value and may be zero. Hereinafter, the same will be applied. Or a certain width of margin may be set to the inside of the end of the display screen and it may be determined that the focus frame reaches the display end when the focus frame moves to the outside of the width of margin of the display screen.

When the focus frame does not reach the display end (No in S505), the CPU 101 moves the focus frame in the direction of operation of the arrow button 105c on the screen of the display unit 104 by an amount corresponding to operation of the arrow button 105c in Step S506. For example, the CPU 101 moves the focus frame on the display screen by a % for one click of the arrow button 105c. When the user continues to press the arrow button 105c, the CPU 101 moves the focus frame on the display screen by a % per a certain period by key repeat. The amount and speed of movement on the screen are the same as those before enlargement, the amount and speed of movement relative to the object become 1/n as compared to those before enlargement.

In the present embodiment, the enlargement area does not move in response to an instruction to move the focus frame in the enlargement mode unlike a conventional technique. Accordingly, since the positional relationship with respect to the whole captured image (whole angle of view) of the enlargement area displayed on the screen is maintained, the user can maintain recognition of the positional relationship of the focus frame in the whole captured image even if he/she has moved the focus frame.

After Step S506, the CPU 101 proceeds to Step S503. When the user presses the zoom button 105b again and the CPU 101 detects an instruction to cancel enlargement (Yes in S503), the CPU 101 cancels the enlargement mode (S504) and returns to the flow of S403 in FIG. 4.

As shown by a display example 304, when the focus frame reaches the display end (Yes in S505), the CPU 101 temporarily cancels the enlargement mode in S507 and temporarily proceeds to the normal mode. In the normal mode, the display unit 104 displays the whole captured image and the focus frame on the display screen in the normal size (enlargement rate of one time). The whole captured image is the maximum area of the captured image to be displayed on the display screen. In this way, it is possible to easily confirm the positional relationship of the enlargement area with respect to the whole angle of view when necessary without bothering the user. Then, in this situation, the user can have the focus frame move while seeing the whole captured image as with S402 of FIG. 4.

When the CPU 101 detects an instruction to move the focus frame (Yes in S508), the CPU 101 moves the focus frame in accordance with the instruction to move on the display screen on which the whole captured image is displayed (S509). At this time, the CPU 101 moves the focus frame by (a/n) % of the display screen for one click of the arrow button 105c. That is, in order to tweak the position of the focus frame, an amount of movement of the focus frame in response to the user's operation is caused to be substantially equal to that in the enlargement mode. That is, in the temporal normal mode, the speed of the movement of the focus frame on the display screen in response to an instruction to move is slower than that in the enlargement mode.

By Steps S507 to S509, the user can select a part of the object where the focus frame is to be placed while visually confirming the position of the focus frame with respect to the whole captured image.

When the CPU 101 does not receive an instruction to move the focus frame (No in S508), the CPU 101 proceeds to enlargement display again in Step S501 while an area of a part of the captured image with the focus detection area corresponding to the focus frame being the center is the enlargement area. For example, when the predetermined time passes without receiving an instruction to move, it is determined that an instruction to move the focus frame has not been received.

In FIG. 4, when the user operates to cease the capture mode and the CPU 101 detects an instruction to cease the capture mode (Yes in S403), the CPU 101 ceases the operation of the capture mode shown in FIG. 4.

Embodiment 2

Figure 6:
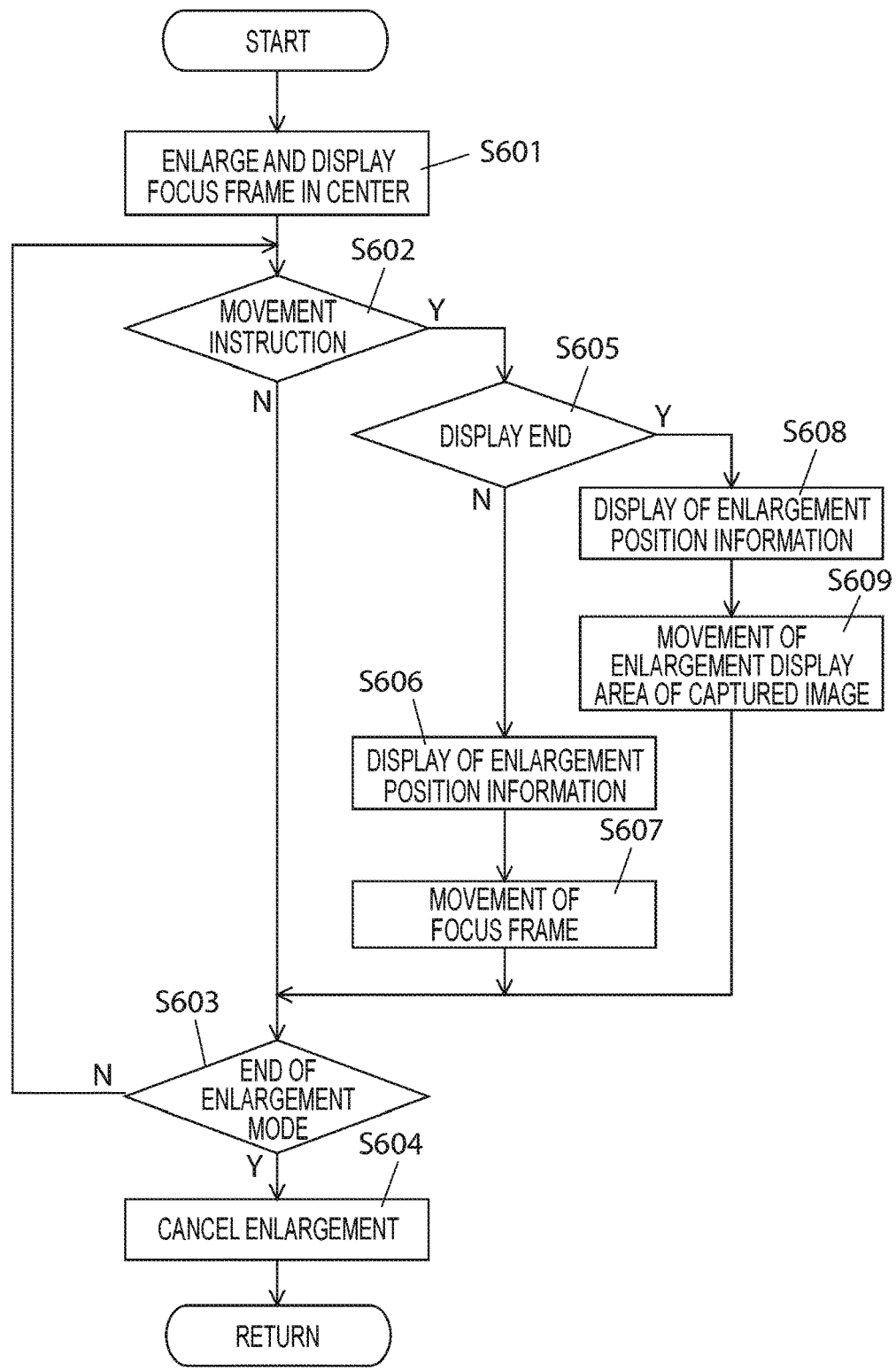
FIG. 6 is a flow chart of an operation of an enlargement mode of the display control apparatus according to one embodiment of the present invention.

When the focus frame reaches the display end in the enlargement mode, a part of the captured image that is being enlarged and displayed (enlargement area) together with the focus frame may be moved in the direction of the instruction to move by the user. FIG. 6 is an operation flow chart in the enlargement mode corresponding to such an operation. The operation of each of Steps S601 to S605 is the same as the operation of each of Steps S501 to S505 in FIG. 5. The operations different from those in FIG. 5 will be described in detail.

When the focus frame does not reach the display end (No in S605), the CPU 101 displays a small screen 305a showing the position of the enlargement area and the focus frame in the whole captured image over the display screen as shown as a display example 305 (S606). The reference numeral 305a shows the whole captured image. The reference numeral 305b shows the area and the position of the part that is currently being enlarged and displayed (enlargement area) with respect to the whole captured image. The reference numeral 305c shows the area and the position of the focus frame with respect to the whole captured image. Then, the CPU 101 moves only the focus frame on the enlargement area by an amount according to the instruction to move in the direction of the instruction to move (S602).

When the focus frame reaches the display end (Yes in S605), the CPU 101 displays the small screen 305a showing the position of the enlargement area and the focus frame in the whole captured image over the display screen as with S606 (S608). Then, the CPU 101 moves the enlargement area on the captured image by an amount corresponding to the instruction to move in the direction of the instruction to move (S609). Accordingly, an area of a part of the captured image that is being enlarged and displayed on the display screen (enlargement area) is updated. At this time, if the focus frame is moved together with the enlargement area, the enlargement area is changed while the focus frame is kept at the display end. On the other hand, if the focus frame is not moved, the focus frame relatively moves toward the inner side of the display screen by an amount of movement of the enlargement area on the captured image.

In the above description, enlargement position information is displayed (S606) even when the focus frame does not reach the display end (No in S605). However, in this case, the enlargement position information may not be displayed. That is, the enlargement position information may be displayed only when the focus frame reaches the display end (Yes in S605). In addition, the enlargement position information may not be displayed until the predetermined time passes and the focus frame reaches the display end again after the enlargement area is changed. Accordingly, since the enlargement position information is displayed when the enlargement area is changed, the user does not lose the positional relationship of the enlargement area with respect to the whole angle of view. In other cases, the user can see a live view around the focus frame without being interrupted by display of the enlargement position information.

With such an operation, in the present embodiment, the position of the focus detection area (focus frame) can be changed while the position of the focus frame in the whole captured image can be visually recognized without canceling enlargement display.

Embodiment 3

As an operation in the enlargement mode, the user may select one of the operation shown in FIG. 5 and the operation in FIG. 6.

When the focus frame reaches the display end in accordance with the instruction to move by the user, movement of the focus frame is once stopped against continuation of the instruction to move toward the display end. In this situation, the focus frame is moved in the direction in which the focus frame does not cross the display end. When the user again inputs an instruction to move in the direction in which the focus frame crosses the display end, the enlargement mode operates in accordance with the flow shown in FIG. 5 when the operation of the instruction to move is performed between the stop and the predetermined time, and operates in accordance with the flow shown in FIG. 6 when the operation of the instruction to move is performed after the predetermined time has passed.

By such a control, the user's operation can select movement of the focus frame by temporarily canceling the enlargement mode or movement of the enlargement area and/or focus frame on the captured image while the enlargement mode is kept. Thus, operability of the user is improved.

Next, another method for the user to select one of the operation shown in FIG. 5 and the operation shown in FIG. 6 as an operation in the enlargement mode will be described.

When the focus frame reaches the display end in accordance with an instruction to move corresponding to the operation of the user, movement of the focus frame is stopped for the predetermined time if the direction of movement is the direction in which the focus frame crosses the display end even if there is an instruction to move. In this situation, the focus frame is moved in the direction in which the focus frame does not cross the display end. When the user continues an instruction to move in the direction in which the focus frame crosses the display end over the predetermined time, the enlargement mode operates in accordance with the flow shown in FIG. 6, and when an instruction to move in the direction in which the focus frame crosses the display end is stopped before the predetermined time has passed, the enlargement mode operates in accordance with the flow shown in FIG. 5.

By such a control, the user's operation can select movement of the focus frame by temporarily canceling the enlargement mode or movement of the enlargement area and/or focus frame on the captured image while the enlargement mode is kept. Thus, operability of the user is improved.

Although the case in which the image capture apparatus includes the display unit 104 and the captured image data and the enlargement area of the captured image data are displayed on the display unit 104 is described in the above embodiments, the present invention is not limited thereto. For example, the image capture apparatus may include a communicating unit, and captured image data stored in a frame buffer may be periodically transmitted to an external apparatus to be displayed on a display apparatus of the external apparatus. In this case, an operation of the user may be performed at the external apparatus, and the CPU 101 may perform the same processing as that described above in response to an instruction to move a focus frame or an enlargement area received from the external apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-123530, filed Jun. 19, 2015, which is hereby incorporated by reference herein in its entirety.

What is claimed is:

1. A display control apparatus comprising:
a processor; and
a memory storing a program which, when executed by the processor, causes the display control apparatus to:
enlarge and display an enlargement area of an image including a focus detection area on a screen;
display a focus frame on the screen over a location corresponding to the focus detection area included in the enlargement area;
move the focus frame on the enlargement area displayed on the screen in response to an operation by a user; and
display a normal area of the image, which is larger than the enlargement area of the image, on the screen instead of the enlargement area of the image if the focus frame moves to an end part of the enlargement area displayed on the screen.

2. The display control apparatus according to claim 1, wherein
the focus frame is displayed over a location corresponding to the focus detection area of the normal area of the image displayed on the screen, and
the enlargement area of the image is displayed on the screen instead of the normal area of the image if the focus frame moves on the normal area of the image displayed on the screen.

3. The display control apparatus according to claim 2, wherein
the enlargement area of the image is displayed on the screen such that a focus detection area corresponding to the moved focus frame is located at a center of the enlargement area when the enlargement area of the image is displayed instead of the normal area of the image.

4. The display control apparatus according to claim 1, wherein
the image is periodically captured by capturing an object and the normal area of the image or an enlargement area of the image is displayed as a live view.

5. The display control apparatus according to claim 1 further comprising:
an image capture unit capturing an object to generate an image; and
a display device displaying at least a part of the image on the screen.

6. The display control apparatus according to claim 1 further comprising:
a receiving unit receiving an image from an image capture apparatus; and
a display device displaying at least a part of the image on the screen.

7. The display control apparatus according to claim 1, wherein the normal area of the image is a whole of the image.

8. A display controlling method comprising:
enlarging and displaying an enlargement area of an image including a focus detection area on a screen;
displaying a focus frame on the screen over a location corresponding to the focus detection area included in the enlargement area;
moving the focus frame on the enlargement area displayed on the screen in response to an operation by a user; and
displaying the normal area of the image on the screen instead of the enlargement area of the image if the focus frame moves to an end part of the enlargement area displayed on the screen.

9. A non-transitory computer-readable storage medium storing a program that, when executed, causes a computer to execute a display controlling process, the display controlling process comprising:
enlarging and displaying an enlargement area of an image including a focus detection area on a screen;
displaying a focus frame on the screen over a location corresponding to the focus detection area included in the enlargement area;
moving the focus frame on the enlargement area displayed on the screen in response to an operation by a user; and
displaying the normal area of the image, which is larger than the enlargement area of the image, on the screen instead of the enlargement area of the image if the focus frame moves to an end part of the enlargement area displayed on the screen.

* * * * *